F. A. FREEMAN.

GARTER PACKAGE.

APPLICATION FILED FEB. 5, 1914.

Reissued Mar. 17, 1914. 13,701.

WITNESSES:

Mae Hofmann

Howard S. Okey

INVENTOR

Frank A. Freeman

BY

Jno. Crosdale

ATTORNEY

COLUMBIA PLANOGRAPH CO., WASHINGTON, D. C.

UNITED STATES PATENT OFFICE.

FRANK A. FREEMAN, OF OVERBROOK, PENNSYLVANIA, ASSIGNOR TO PIONEER SUSPENDER COMPANY, A CORPORATION OF PENNSYLVANIA.

GARTER-PACKAGE.

13,701. Specification of Reissued Letters Patent. Reissued Mar. 17, 1914.

Original No. 1,082,265, dated December 23, 1913, Serial No. 616,614. Application for reissue filed February 5, 1914. Serial No. 816,855.

*To all whom it may concern:*

Be it known that I, FRANK A. FREEMAN, a citizen of the United States, residing at Overbrook, in the county of Philadelphia and State of Pennsylvania, have invented a new and useful Garter-Package, of which the following is a specification.

My invention relates to packaging pad garters.

The object is to provide a neat and stable package peculiarly adapted for display purposes and capable of being packed in a box of minimum depth.

Figure 1:
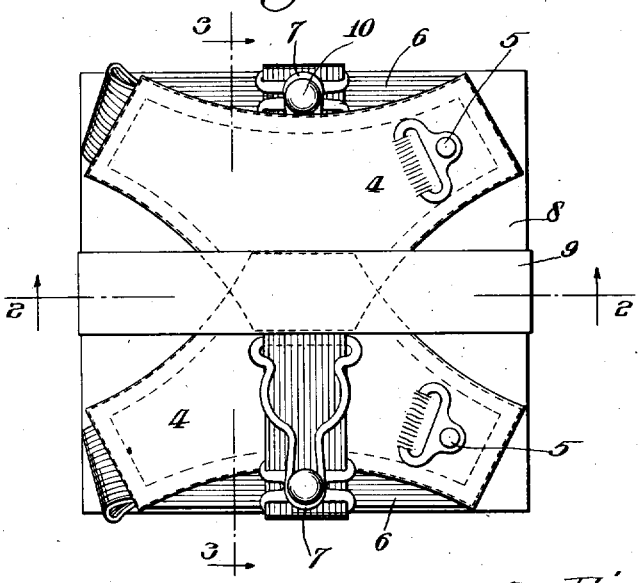
Figure 2:
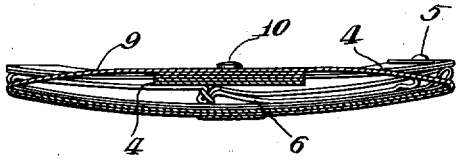
Figure 3:
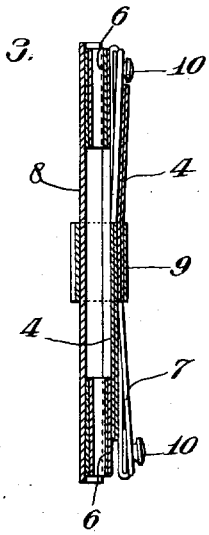

Referring to the drawings:—Figure 1 is a plan view of a pair of pad garters placed upon and secured to a flat card in accordance with my invention and ready for insertion in the box. Fig. 2 is a section on line 2—2 of Fig. 1. Fig. 3 is a section on line 3—3 of Fig. 1.

Similar numerals refer to similar parts throughout the several views.

The garters each comprise a flat triangular nonelastic pad 4, a hook-member 5 secured to one of the upper corners of the pad, and a leg band 6, usually of elastic webbing, secured to the opposite corner of the pad and provided at its free end with means for engaging hook-member 5. Clasps or hose-grips 7 for engaging the stockings are secured to the lower ends of the pads. The garters when properly folded and assembled in the manner to be described, are placed upon the square card 8, being held in place thereon by band 9.

To form the package shown in the drawings, each leg band 6 is first folded beneath the upper extension of its respective pad 4. The garters are then placed, one upon the other, with the folded leg bands and the upper extensions of the pads upon opposite edges of card 8, with clasps 7 extending in opposite directions. In this position the lower extensions of the pads lie one upon the other without interposed webbing either between or beneath them, one of the clasps being preferably inserted between the leg band and the pad. In which position, button or projection 10 of the clasp engages the upper edge of the upper pad. Band 9, passing around card 8 or secured thereto, passes across the narrowed lower extensions of pads 4, holding them securely upon the card. In this position of the parts, independent outward movement of either garter is prevented by the engagement of button 10 with the upper edge of the upper pad, while retaining band 9 prevents the accidental slipping of the garters from the pads in other directions.

It will thus be seen that by my invention I am enabled to provide an extremely simple, stable and efficient packet. It is also to be noted that, as the retaining band merely passes across the lower narrowed extensions of the pads, it does not interfere with the inspection of the upper pad, and that, as the leg bands are folded upon opposite sides of the card away from the superposed portions of the pads, the package will be flat and capable of packing without springing in a shallow box. This band also serves as a convenient means for displaying words or devices indicating some quality, characteristic or the origin of the garters.

What I claim is:—

A package comprising a substantially square card, a pair of pad garters, each having the leg band folded back of the pad, the garters so assembled that the clasp end of one pad superimposes the clasp end of the other, the button of one clasp projecting approximate the curved top of the other pad, the said curved tops of the pads lying along the opposite parallel margins of the card, and a retainer for securing the garters to the card midway said opposite parallel card margins.

FRANK A. FREEMAN.

Witnesses:
MAE HOFMANN,
HERBERT C. RUSSELL.

Copies of this patent may be obtained for five cents each, by addressing the "Commissioner of Patents, Washington, D. C."